United States Patent [19]

Kondo et al.

[11] Patent Number: 4,841,491

[45] Date of Patent: Jun. 20, 1989

[54] ULTRASONIC BEAM FORMER

[75] Inventors: Shinichi Kondo, Kodaira; Kageyoshi Katakura; Toshio Ogawa, both of Tokyo; Shin'ichiro Umemura; Hiroshi Ikeda, both of Hachioji, all of Japan

[73] Assignees: Hitachi Ltd.; Hitachi Medical Corp., both of Tokyo, Japan

[21] Appl. No.: 892,287

[22] Filed: Aug. 4, 1986

[30] Foreign Application Priority Data

Aug. 7, 1985 [JP] Japan ............................... 60-173458
Dec. 11, 1985 [JP] Japan ............................... 60-281423

[51] Int. Cl.[4] ............................................. G01S 15/06

[52] U.S. Cl. ............................... 367/103; 128/661.01; 367/123

[58] Field of Search ................. 367/123, 122, 119, 99, 367/100, 103, 905, 150, 900, 98; 128/661.01, 660.08

[56] References Cited

U.S. PATENT DOCUMENTS

| | | | |
|---|---|---|---|
| 3,869,693 | 3/1975 | Jones | 367/122 |
| 4,031,743 | 6/1977 | Kossoff et al. | 73/629 |
| 4,332,018 | 5/1982 | Sternberg et al. | 367/103 |
| 4,334,432 | 6/1982 | Gill | 367/103 |
| 4,460,987 | 7/1984 | Stokes et al. | 367/123 |
| 4,679,176 | 7/1987 | Ogawa et al. | 367/123 |

*Primary Examiner*—Thomas H. Tarcza
*Assistant Examiner*—Tod Swann
*Attorney, Agent, or Firm*—Antonelli, Terry & Wands

[57] ABSTRACT

In an ultrasonic beam former for phasing and adding received signals supplied from respective elements of an ultrasonic transducer array and for producing the received output in conformity to a desired wave front, a plurality of sampling delay means for sampling and delaying the received signal supplied from each element are disposed for each channel. The plurality of delay means effect the sampling operation successively and alternately. Outputs of delay means are selected by switches activated in response to the alternate sampling operation. As a result, the sampling rate per signal channel is increased.

11 Claims, 7 Drawing Sheets

FIG. 4
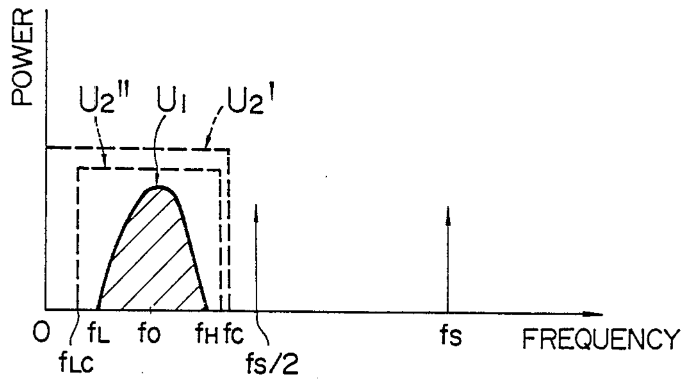
FIG. 5A
FIG. 5B
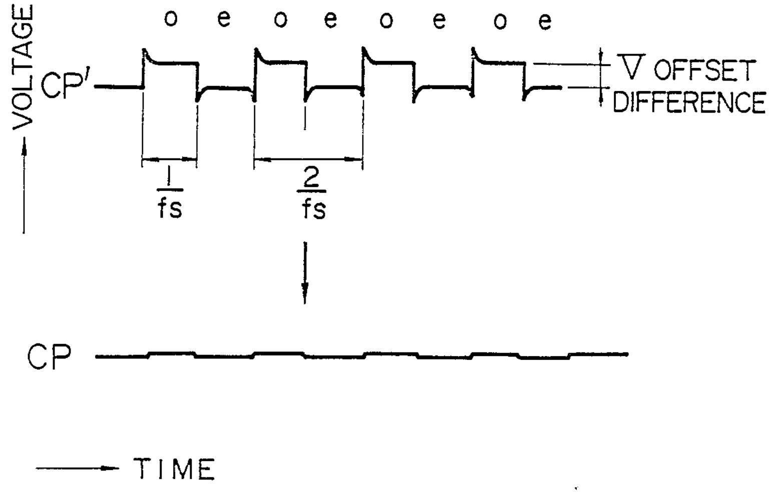

ULTRASONIC BEAM FORMER

BACKGROUND OF THE INVENTION

The present invention relates to an ultrasonic beam former used in ultrasonic tomography units of electronic scanning type, for example. For receiving the ultrasonic wave coming from the desired position on the section of the object in conformity to the wave front, electric signals produced from respective elements of the transducer array are controlled in phase and added together in the ultrasonic beam former which is composed of wave receiving and phasing circuits. In the phase circuits of the conventional ultrasonic tomography unit of electronic scanning type, lump constant (LC) delay lines were used.

In a wave receiving and phasing circuit described in Japanese Patent Unexamined Publication No. 141142/83 (JA-A-58-141142), for example, sampling delay means such as a sample-and-hold circuit is used instead of the LC delay line. In this circuit using the sampling delay means, respective received signals are sampled at a frequency higher than twice the highest frequency within the signal band. The signal values thus sampled are held during time periods corresponding to respective delay time values and added together to receive and phase ultrasonic wave signals.

If a higher frequency is used as the ultrasonic frequency to yield images with high resolution, however, the sampling must also be effected at a higher frequency. Because of a limit in the operation speed of the sampling element, therefore, it was difficult to apply the above described receiving and phasing circuit to a high ultrasonic frequency.

Further, the received signal supplied from the transducer element has an extremely high dynamic range. Since the dynamic range of the sampling element is generally narrow, however, it was difficult to obtain a tomographic image of wide range in the depth direction with a high signal-to-noise ratio.

SUMMARY OF THE INVENTION

Therefore, an object of the present invention is to provide a beam former which can be applied to high ultrasonic frequencies.

Another object of the present invention is to provide an ultrasonic beam former capable of producing the above described tomographic image with a high signal-to-noise ratio and with high performance.

In accordance with one feature of the present invention, an ultrasonic beam former comprises a plurality of receivers respectively for receiving the received wave signal of respective elements of a transducer array; a plurality of sampling delay means are disposed in parallel for a signal supplied from each of the receivers, the plurality of sampling delay means alternately sampling the signal; selection means for alternately selecting outputs of the plurality of circuits of sampling delay means; addition means for adding together outputs of respective delay means selected by the selection means; and filter means for filtering the output of the addition means.

Owing to this configuration, the sampling rate of the received signal can be increased by the number of delay means per signal channel. Since higher frequencies can thus be used as the ultrasonic frequency, images of high resolution can be obtained.

In accordance with another feature of the present invention, addition means as many as delay means per signal channel are provided, and one of the outputs of the delay means belonging to each channel is coupled to each addition means. And outputs of the plurality of addition means are alternately selected by selection means. This configuration also brings about the above described effect.

In accordance with still another feature, a receiving amplifier having an amplification factor which changes stepwise with the elapse of time is used as the receiving means.

BRIEF DESCRIPTION OF THE DRAWINGS

FIG. 4 is a characteristic diagram showing the output spectrum of the above described embodiment.

FIGS. 5A and 5B are waveform diagrams respectively showing outputs CP′ and CP of the above described embodiment.

DESCRIPTION OF THE PREFERRED EMBODIMENTS

Figure 1:
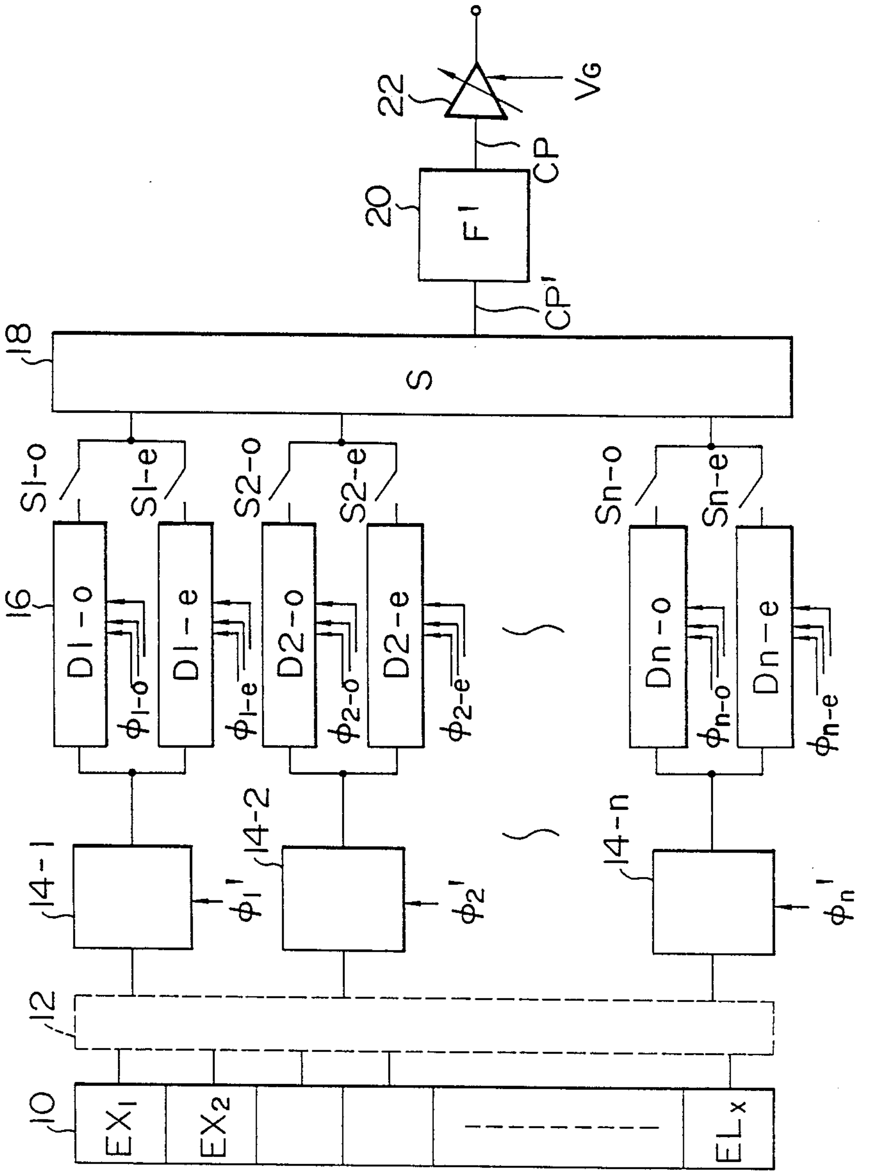
FIG. 1 is a block diagram for illustrating an embodiment of the present invention.

FIG. 1 is a block diagram of an embodiment of the present invention.

An array type ultrasonic transducer 10 has arranged transducer elements $EL_1$ to $EL_x$. Signals of respective elements of the ultrasonic transducer are respectively supplied to n receiving amplifiers 14 - 1 to 14 - *n* via a switch matrix 12. Output signals of the receiving amplifiers are supplied to sampling delay means 16 which are duplicated for each signal channel. That is to say, the output signal of the receiving amplifier 14 - 1 is supplied to paired delay means D1 - *o* and D1 - *e*. The output signal of the receiving amplifier 14 - 2 is supplied to delay means D2 - *o* and D2 - *e* and the output signal of the receiving amplifier 14 - *n* is supplied to delay means Dn - *o* and Dn - *e*. The outputs of these delay means are coupled to an adder 18 via selection switches S1 - *o*, S1 - *e*, S2 - *o*, S2 - *e*, ---, Sn - o and Sn - e which are alternately turned on. The output of the adder 18 is supplied to a time gain control amplifier 22 via a low-pass filter 20.

Figure 3A:
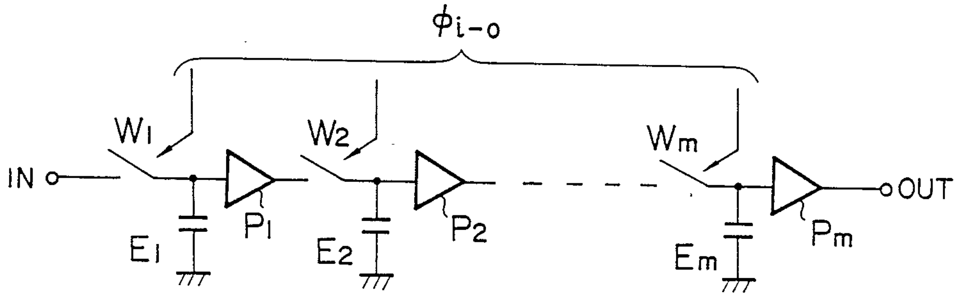
FIGS. 3A, 3B, 6A, 6B and 6C are circuit diagrams respectively showing concrete circuit examples of the above described embodiment.

As sampling delay means D1 - *o*, D1 - *e*, ---, Dn - o, Dn - e, sample-and-hold circuits connected in series as shown in FIG. 3A, for example, can be used.

Sampling switches $W_1$, $W_2$ --- $W_m$, holding capacitors $E_1$, $E_2$ --- $E_m$, buffer amplifiers $P_1$, $P_2$ --$P_m$, an input terminal IN and an output terminal OUT are shown in FIG. 3A. When the sampling switch $W_1$ is opened, the potential of the signal sampled by the switch $W_1$ is held on the capacitor $E_1$.

The switches $W_2$ to $W_m$ and the capacitors $E_2$ to $E_m$ belonging to the second to m-th stages and located behind the buffer amplifiers $P_1$ to $P_m$ operate in the same way as the switch $W_1$ and the capacitor $E_1$.

Figure 2:
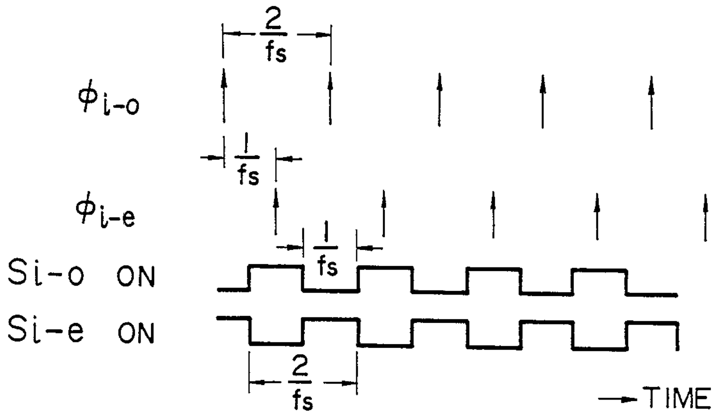
FIG. 2 is a time chart for illustrating the operation of the embodiment of FIG. 1.

FIG. 2 is a time chart for illustrating the operation effected in the configuration of FIG. 1. Sampling control signals $\phi_{i-o}$ and $\phi_{i-e}$ supplied to paired sampling delay means $D_{i-o}$ and $D_{i-e}$ associated with a certain amplifier 14 - 1 are shown together with the selection switches $S_{i-o}$ and $S_{i-e}$. The outputs of delay means $D_{i-o}$ and $D_{i-e}$ for received signals are alternately selected by the selection switches $S_{i-o}$ and $S_{i-e}$ alternately used for sampling. When the sampling frequency of each sampling delay means is fs/2, therefore, the signal is resampled at the frequency fs. Each arrow in FIG. 2 represents the sampling timing for the first stage of the multistage sample-and-hold circuit shown in FIG. 3A. The sampling timing of a succeeding stage included in the sample-and-hold circuit is supplied with a time delay according to the desired delay. That is to say, the output signal delays with respect to the input signal by the sum of hold time values of respective stages. The maximum value allowed for the holding time of each stage is $T=2/fs$.

Figure 3B:
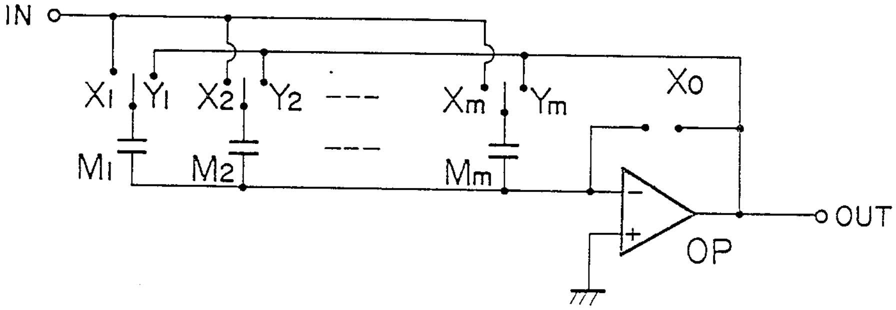

FIG. 3B shows an example in which switched capacitor memories are employed as the delay means $D_{i-o}$ and $D_{i-e}$ using the sampling technique. This circuit has an input terminal IN and an output terminal OUT. Writing switches $X_1$ to $X_m$ and reading switches $Y_1$ to $Y_m$ are disposed for memory capacitors $M_1$ to $M_m$, respectively. A reset switch $X_o$ and an operational amplifier OP are also included in the circuit. Sampling in this circuit is effected by successively writing the signal supplied from the receiving amplifier into the memory capacitors $M_1$ to $M_m$ at a repetition period $T=2/fs$. The writing switches $X_1$ to $X_m$ successively operate with the timing of $\phi_{i-o}$ of FIG. 2 for the delay means $D_{i-o}$ and with the timing of $\phi_{i-e}$ for the delay means $D_{i-e}$. The writing switches and the reading switches $Y_1$ to $Y_m$ are alternately activated. The delay value is controlled by the length of the holding time for each of the memory capacitors $M_1$ to $M_m$. The maximum resultant delay is mT when the sampling period is represented as $T=2/fs$. A delay including a fraction period smaller than the sampling period T can be realized by shifting phases of timings for respective capacitors.

Whichever delay means is used, the signal of each channel is sampled alternately at two delay means in the embodiment of FIG. 1. Accordingly, a sampling frequency which is twice that of the prior art can be dealt with.

In the embodiment of FIG. 1, two delay means of each channel differ in parasitic capacitance and amplifier offset. Therefore, the signal at a terminal CP' which has undergone phasing and addition includes a noise caused by the offset difference having a repetition period of 2/fs.

The power spectrum of the signal at the terminal CP' is shown in FIG. 4. The spectrum of the noise caused by the above described offset difference exists at the frequency fs/2. The spectrum of the noises caused by both control signals exists at the frequency fs. The power spectrum of the received signal itself which has been delayed is represented by a curve $U_1$ extending from a frequency $f_L$ to another frequency $f_H$.

The low-pass filter 20 eliminates the noise caused by the control signal and the noise caused by the offset. For this purpose, the filter 20 must have low-pass frequency response characteristics as represented by $U_2'$ of FIG. 4 or bandpass frequency response characteristics as represented by $U_2''$ of FIG. 4. That is to say, the higher cutoff frequency $f_c$ must satisfy the relationship $$f_H<f_c<f_s/2.$$

The lower cutoff frequency $f_{cL}$ must satisfy the relationship $$0\leqq f_{cL}<f_L.$$

The signal at a point CP which has passed through the low-pass filter 20 is shown in FIG. 5B.

When the ultrasonic wave is transmitted and received, it is attenuated inside the object. With the elapse of time after transmission therefore, the strength of the reflected wave is weakened. The reflected wave from a deep portion of the object has a smaller amplitude than the reflected wave from a shallow portion. In ultrasonic photographing, therefore, such a change in amplitude must be compensated. The time gain control amplifier 22 of FIG. 1 compensates such a change in amplitude.

Figure 6A:
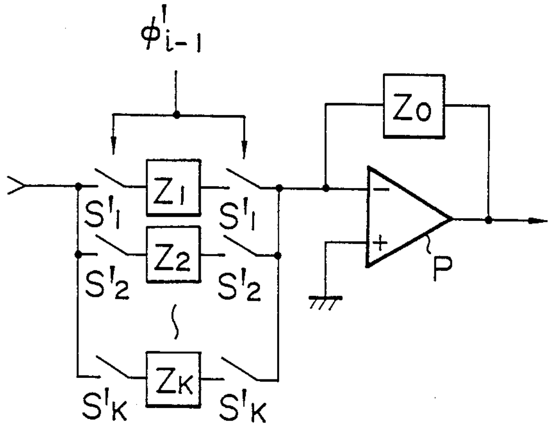
Figure 6B:
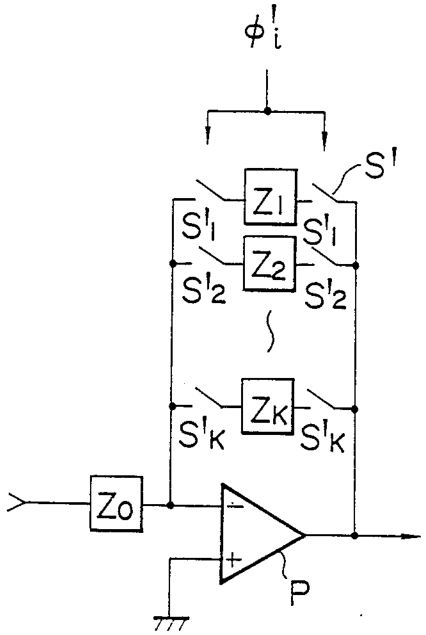
Figure 6C:
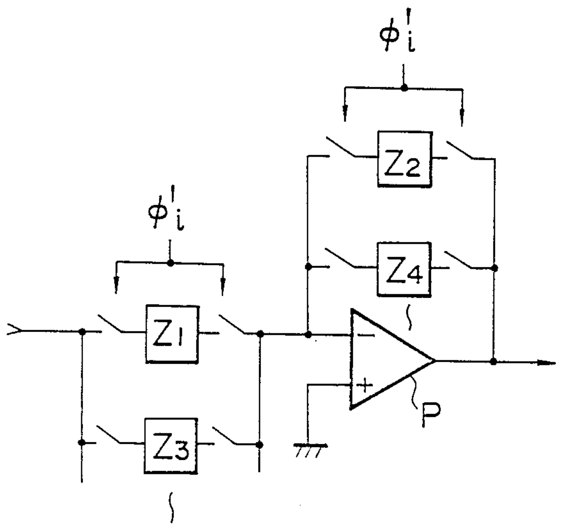

Further, in the embodiment of FIG. 1, sampling delay means is used as delay means and it has a narrow dynamic range. Accordingly, a special contrivance is adopted in the embodiment of FIG. 1. That is to say, the amplification factor of each of the receiving amplifiers 14 - 1, 14 - 2, --- 14 - n illustrated in FIG. 1 can be stepwise varied in k stages. Control signals $\phi'_1$, $\phi'_2$ --- $\phi'_n$ changes the amplification factor. FIGS. 6A, 6B and 6C respectively show embodiments of the receiving amplifiers 14 - 1 to 14 - n. In all of these embodiments, the circuit is composed of an operational amplifier P for amplifying the received signal, resistors or capacitors $Z_o$ to $Z_k$ for defining the amplification factor of the operational amplifier P, and switches $S'_1$ to $S'_k$ for changing over the amplification factor. The circuit of FIG. 6A has k input resistors (or capacitors) $Z_1$ to $Z_k$. The switches $S'_1$ to $S'_k$ are successively turned on to change the amplification factor stepwise. The circuit of FIG. 6B has k feedback resistors (or capacitors) $Z_1$ to $Z_k$. The switches $S'_1$ to $S'_k$ are successively turned on to change the amplification factor stepwise. In the circuit of FIG. 6C, both the input resistor and feedback resistor are changed over.

Figure 7A:
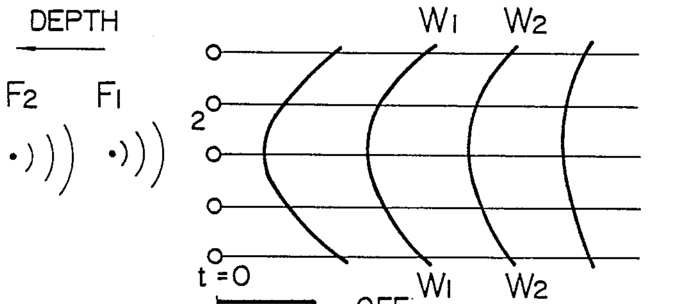
FIGS. 7A to 7E are time charts showing gain control characteristics of the above described embodiment.
Figure 7B:
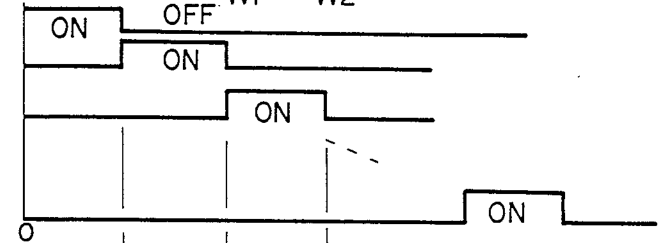
Figure 7C:
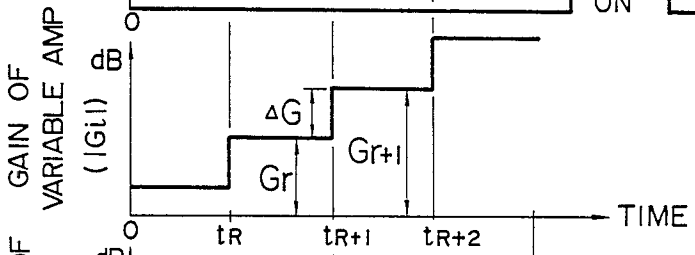

FIG. 7B shows the operation of the switches $S'_1$ to $S'_m$ when the circuit of FIG. 6A or 6B is used. The expression $t=0$ represents the time of wave transmission. With the elapse of time thereafter, the reflected waves coming from reflection points located at longer distance are successively measured by respective elements. Curves $W_1$ and $W_2$ of FIG. 7A represent the time when the wave fronts of the reflected waves coming from reflection points $F_1$ and $F_2$ are measured by respective elements, respectively. The reflected wave coming from a reflection point located at a longer distance is attenuated more strongly. By the operation of switches $S'_1$ to $S'_k$ as shown in FIG. 7B, the gain of the receiving amplifier is increased by $\Delta G$ when the time $t_R$, $t_{R+1}$, $t_{R+2}$ --- have been reached. However, the control signals ($\phi'_1$ to $\phi'_n$ of FIG. 1) for changing over the switches $S'_1$ to $S'_k$ are respectively issued somewhat earlier than the time $t_R$, $t_{R+1}$, $t_{R+2}$ --- on the basis of delays caused by the sampling delay means connected to respective receiving amplifiers. After the signal has been passed through respective delay means, the gain variation of each of the receiving amplifiers 14 - 1 to 14 - n can be represented as FIG. 7C.

Figure 7D:
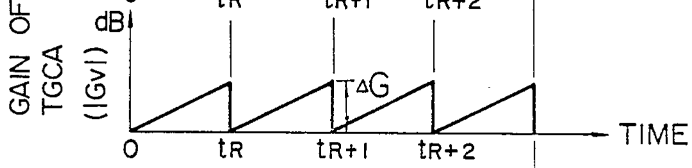
Figure 7E:
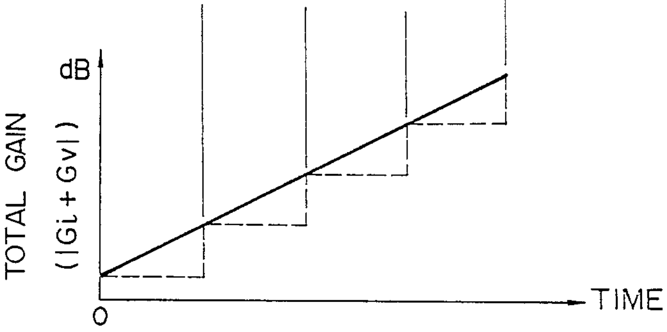

On the other hand, the time gain control amplifier 22 is so controlled by a gain control signal $V_G$ that its amplification factor will change while following the sawtooth wave form as illustrated in FIG. 7D. Therefore, the gain of the entire phasing circuit shown in FIG. 1 changes continuously with the elapse of time after the wave transmission as shown in FIG. 7E.

Figure 8:
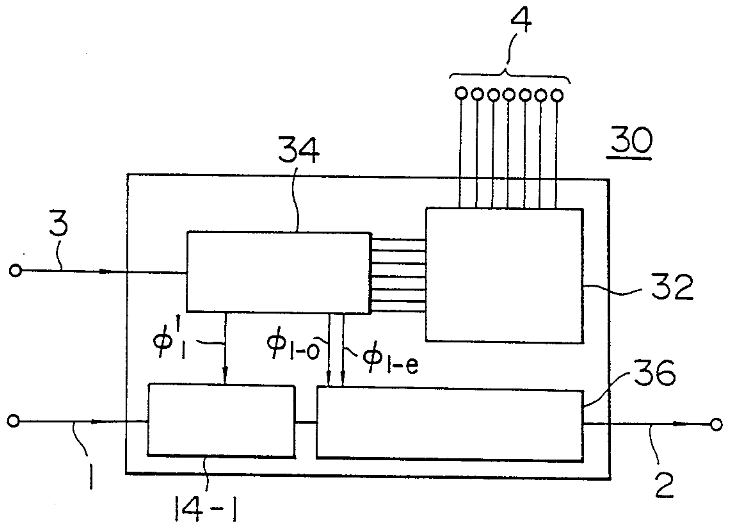
FIG. 8 is a block diagram showing IC configuration of the above described embodiment.

FIG. 8 shows the configuration of an IC for realizing the phasing circuit of FIG. 1. A memory 32 is used to store therein delay data for delaying the output of the first receiving amplifier 14 - 1 illustrated in FIG. 1 on the basis of the wave front of the reflected wave which successively changes as shown in FIG. 7A. Terminals 4 are used to supply data to the memory 32. Data stored in the memory 32 are read out into a control circuit 34. On the basis of the data thus read out, the control circuit 34 issues the control signal $\phi'_1$ for controlling the gain of the receiving amplifier, the control signals $\phi_{1-o}$ and $\phi_{1-e}$ for controlling the sampling delay means, and the control signals for controlling the changeover switches S1 - *o* and S1 - *e*. A signal 3 indicates the wave transmission timing. A block 36 contains the sampling control means D1 - *o* and D1 - *e* as well as the switches S1 - *o* and S1 - *e* of FIG. 1. The control memory, control circuit, receiving amplifier and delay means per signal channel are integrated into one IC chip. Each of other channels is similarly integrated into one IC chip. The phasing circuit of FIG. 1 is thus obtained. If each signal channel is thus contained in an individual IC, the timing control signal which differs from channel to channel is prevented from mixing with the received signal of the adjacent channel, resulting in an improved signal-to-noise ratio of the phasing circuit.

On the other hand, receiving amplifiers and delay means of a plurality of channels may be formed on one IC chip. In this case, it is preferable that power source lines and ground lines are formed separately for each channel in order to prevent crosstalk coupling between the channels.

Figure 9:
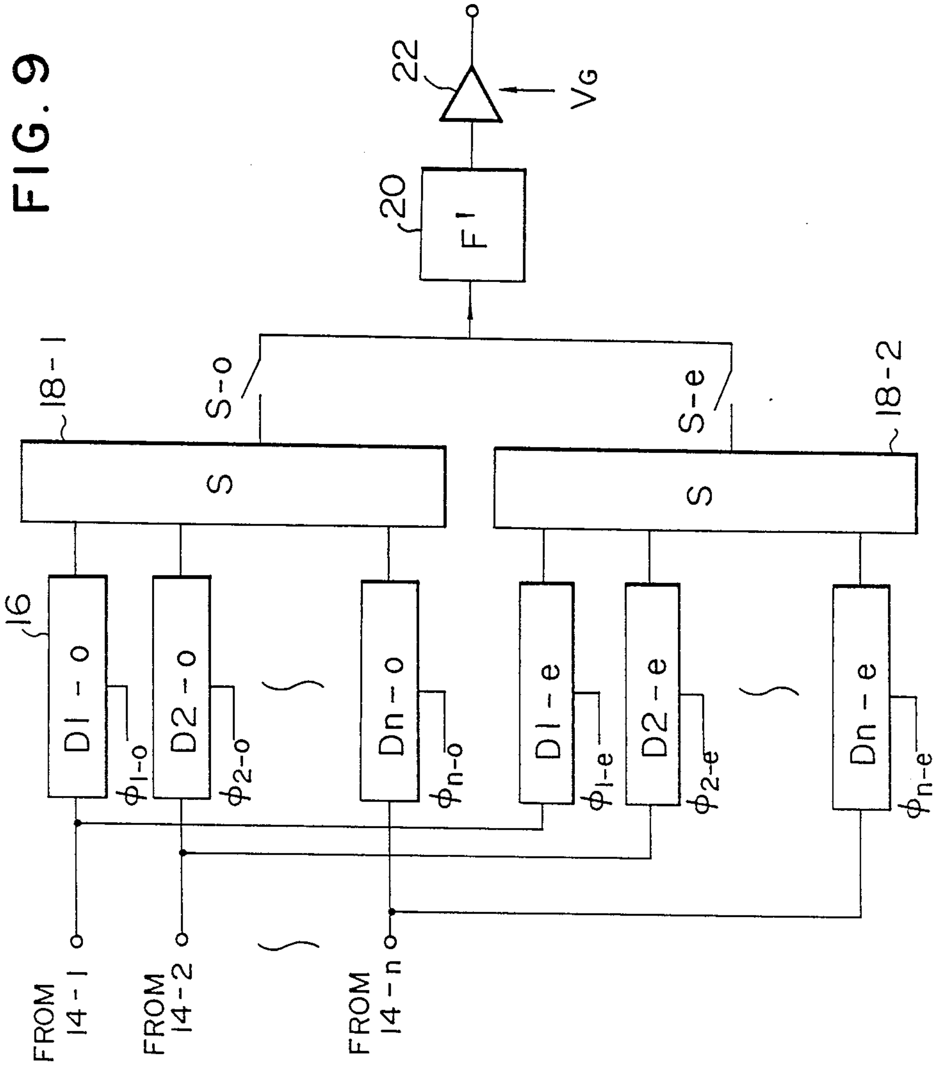
FIG. 9 is a block diagram showing another embodiment of the present invention.

FIG. 9 shows another embodiment which is a variation of the configuration of FIG. 1. In this configuration, outputs of D1 - *o*, D2 - *o* --- Dn - o included in the sampling delay means 16 having two delay means per signal channel are coupled to adding means 18 - 1. Outputs of D1 - *e*, D2 - *e* --- Dn - e are coupled to another adding means 18 - 2. Outputs of these adding means are coupled to the low-pass filter 20 and the time gain control amplifier 22 via changeover switches S - o and S - *e*, respectively. The changeover switches S - o and S - e are alternately turned on when the holding operation for received signals of all channels belonging to the switch has been completed. In the very same way as the embodiment of FIG. 1, sampling operation is thus effected by alternately using the multiplexed sampling means.

In the above described embodiments, two circuits of delay means are disposed for each received signal and are alternately sampled. However, it is evident that a similar effect can be obtained even if three or more circuits of delay means are disposed and successively changed over to yield the sampling delay.

We claim:

1. An ultrasonic beam former comprising:
   a plurality of receiving amplifiers for independently amplifying received signals of respective elements of a transducer array, the amplification factor of each of said receiving amplifiers being changed stepwise so that the gain increases with the elapse of time after each wave transmission;
   a plurality of channels. each having a plurality of sampling delay means for delaying by a different amount the output of each of said plurality of receiving amplifiers during a single signal reception period following each transmitted signal;
   addition means for adding together outputs of said plurality of sampling means having corresponding delays; and
   a time gain control amplifier for amplifying the output of said addition means, the amplification factor of said time gain control amplifier changing in a sawtooth wave form.

2. In an ultrasonic tomography unit for deflecting and/or focusing an ultrasonic beam to yield tomographic images by controlling the amplitude and phase of a received wave signal of each element of a transducer array, an ultrasonic beam former comprising:
   a plurality of receiver amplifiers each receiving the received wave from an associated element of said transducer array;
   plural sets of delay means, each set being disposed for each of said receiver amplifiers to provide a corresponding amount of signal delay to each output of said receiver amplifiers, and each set including a plurality of sampling delay circuits connected in parallel to receive the output from an associated receiver amplifier;
   means for supplying timing signals to said sampling delay circuits so that said sampling delay circuits in each set of said delay means alternately and successively samples a signal supplied from the associated receiver amplifier during a single signal reception period following each transmitter signal;
   selection means, each being disposed for each set of said delay means, for alternately selecting outputs of said sampling delay circuits in each set of said delay means;
   addition means for adding together outputs of said plural sets of delay means selected by said selection means and producing an output signal; and
   means for filtering the output signal of said addition means.

3. An ultrasonic beam: former according to claim 2, wherein each of said receiver amplifiers has an amplification factor which changes stepwise so that the gain of the amplifier increases with the image of time after each wave transmission.

4. An ultrasonic beam former according to claim 3, wherein the amplification factor of each of said receiver amplifiers changes at the timing corresponding to a delay amount caused by said delay means connected to each of receiver amplifiers.

5. An ultrasonic beam former as defined in claim 2 wherein the sampling delay means in each channel comprises a plurality of elements connected in series, the delay time associated with each channel being controllable for a holding period that is determined by a difference between a sampling time associated with one element and a sampling time associated with the next series connected element in said channel.

6. In an ultrasonic tomography unit for deflecting and/or focusing an ultrasonic beam to yield tomographic images by controlling the amplitude and phase of a received wave signal of each element of a transducer array, an ultrasonic beam former comprising:
   a plurality of receivers;
   a plural number of sampling delay means disposed in each signal channel for each of said receivers, said plurality of sampling delay means alternately and successively sampling a channel signal delayed by differing amounts supplied from each receiver during a single signal reception period following each transmitted signal;

addition means for adding together correspondingly delayed outputs among outputs of said parallel channels;

selection means for alternately selecting outputs of said addition means and for producing an output signal; and filter means for filtering the output signal of said selection means.

7. An ultrasonic beam former according to claim 6, wherein each of said receivers comprises an amplifier having an amplification factor which changes stepwise so that the gain of the amplifier increases with the lapse of time after each wave transmission.

8. An ultrasonic beam former comprising:

a plurality of receiving amplifiers respectively for amplifying received signals of respective elements of a transducer array;

a plurality of sampling delay means for sampling and delaying the output of each of said receiving amplifiers;

a memory for storing therein delay data for each of said sampling delay means; and a control circuit for producing timing control signals to each sampling delay means on the basis of data read out from said memory, said receiving amplifier, said sampling delay means, said memory and said control circuit for the same signal channel being formed in the same IC chip.

9. An ultrasonic beam former as defined in claim 8 further comprising a plurality of separate IC chips and means to prevent mixing of received signals from an adjacent channel by forming the receiving amplifier, sampling delay means, memory and control circuit for each single signal channel in a separate IC chip.

10. In an ultrasonic tomography unit for deflecting and/or focusing an ultrasonic beam to yield tomographic images by controlling the amplitude and phase of a received wave signal of each element of a transducer array, an ultrasonic beam former comprising:

a plurality of receiver amplifiers each receiving the received wave from an associated element of said transducer array;

plural sets of sampling delay circuits with each set comprising a channel wherein each sampling delay circuit in a channel provides a different amount of signal delay and the delay amounts for each of plural sets of sampling delay means is equal;

means connecting each channel to an associated one of said receiver amplifiers in a manner so that each of said sampling delay means in a channel alternately and successively samples a signal supplied from the associated receiver amplifier during a single signal reception period following each transmitter signal; and means for alternately selecting outputs of said sampling delay circuits in each set and for adding together said selected outputs from each channel that have comparable delays.

11. An ultrasonic beam former as defined in claim 10 wherein the sampling delay means in each channel comprises a plurality of elements connected in series, the delay time associated with each channel being controllable for a holding period that is determined by a difference between a sampling time associated with one element and a sampling time associated with the next series connected element in said channel.

* * * * *